United States Patent
Lin et al.

(10) Patent No.: US 10,733,481 B2
(45) Date of Patent: Aug. 4, 2020

(54) CLOUD DEVICE, TERMINAL DEVICE, AND METHOD FOR CLASSIFYING IMAGES

(71) Applicant: HON HAI PRECISION INDUSTRY CO., LTD., New Taipei (TW)

(72) Inventors: Jung-Yi Lin, New Taipei (TW); Chin-Pin Kuo, New Taipei (TW); I-Hua Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 53 days.

(21) Appl. No.: 16/260,414

(22) Filed: Jan. 29, 2019

(65) Prior Publication Data

US 2020/0210754 A1    Jul. 2, 2020

(30) Foreign Application Priority Data

Dec. 29, 2018   (CN) .......................... 2018 1 1639424

(51) Int. Cl.
*G06K 9/62*   (2006.01)
*G06K 9/00*   (2006.01)
*G06N 3/04*   (2006.01)

(52) U.S. Cl.
CPC ......... *G06K 9/627* (2013.01); *G06K 9/00624* (2013.01); *G06K 9/00979* (2013.01); *G06N 3/04* (2013.01)

(58) Field of Classification Search
CPC .. G06K 9/627; G06K 9/6267; G06K 9/00288; G06K 9/00718; G06K 9/6218; G06K 9/00624; G06K 9/00711; G06K 9/00765; G06K 9/00979; G06K 9/4604; G06T 2207/20084; G06T 2207/20081; G06T 7/13; G06T 9/002; H04N 5/33; G06N 3/04
See application file for complete search history.

(56) References Cited

U.S. PATENT DOCUMENTS 10,037,601 B1 * 7/2018 Ben-Ari ............... G06K 9/4604
10,426,442 B1 * 10/2019 Schnorr ................ A61D 19/02
10,646,156 B1 * 5/2020 Schnorr ............ G06K 9/00671
(Continued)

FOREIGN PATENT DOCUMENTS

CN    103186649 A    7/2013
CN    106250812 A    12/2016

*Primary Examiner* — Jingge Wu
(74) *Attorney, Agent, or Firm* — ScienBiziP, P.C.

(57) ABSTRACT

A cloud device, a terminal device, and an image classification system and method includes the terminal reading an image to be classified; transmitting an instruction of image classification to the cloud device; determining whether the instruction of image classification comprises an intermediate operation result of the first partial operation; performing the second partial operation to obtain an image classification result, when the instruction of image classification comprises intermediate operation result of the first partial operation; and transmitting the image classification result to the terminal device; performing the first partial operation to obtain the intermediate operation result, when the intermediate operation result is not contained in the instruction of image classification; transmitting the intermediate operation result to the terminal device; and performing the second partial operation to obtain an image classification result.

15 Claims, 4 Drawing Sheets

(56) References Cited

U.S. PATENT DOCUMENTS

| | | | |
|---|---|---|---|
| 10,650,564 B1* | 5/2020 | Lin | G06T 17/20 |
| 2013/0339105 A1* | 12/2013 | Russell | G09B 19/04 |
| | | | 705/7.42 |
| 2018/0165554 A1* | 6/2018 | Zhang | G06K 9/6256 |
| 2018/0300338 A1* | 10/2018 | Gebremariam | G06F 16/24554 |
| 2018/0365278 A1* | 12/2018 | Klohn | G06N 3/006 |
| 2019/0021649 A1* | 1/2019 | Van Snellenberg | A61B 5/445 |
| 2019/0114531 A1* | 4/2019 | Torkamani | G06N 3/0481 |
| 2019/0138829 A1* | 5/2019 | Gurghian | G06K 9/00624 |
| 2019/0180244 A1* | 6/2019 | El Kharzazi | G06N 3/0445 |
| 2019/0205606 A1* | 7/2019 | Zhou | G06N 3/0445 |
| 2019/0205649 A1* | 7/2019 | Ananthanarayanan | |
| | | | G06K 9/00718 |
| 2019/0236782 A1* | 8/2019 | Amit | A61B 10/0041 |
| 2019/0303762 A1* | 10/2019 | Sui | G06N 3/063 |
| 2019/0304092 A1* | 10/2019 | Akselrod-Ballin | G06T 7/143 |
| 2019/0311202 A1* | 10/2019 | Lee | G06K 9/00765 |
| 2019/0340190 A1* | 11/2019 | Ganteaume | G06F 9/5038 |
| 2019/0340428 A1* | 11/2019 | Wickett | G06K 9/00449 |
| 2019/0347388 A1* | 11/2019 | Jiang | H04L 63/102 |
| 2020/0012725 A1* | 1/2020 | Li | G06K 9/6256 |
| 2020/0042833 A1* | 2/2020 | Toor | G06K 9/6267 |
| 2020/0050555 A1* | 2/2020 | Kim | G06N 20/10 |
| 2020/0104721 A1* | 4/2020 | Mori | G06N 3/084 |

\* cited by examiner

CLOUD DEVICE, TERMINAL DEVICE, AND METHOD FOR CLASSIFYING IMAGES

FIELD

The disclosure generally relates to terminal devices communicating with a cloud device.

BACKGROUND

Deep learning method in artificial intelligence (AI) is making breakthroughs in image recognition, classification, and segmentation. The processes of deep learning include training and inference. The training process requires a large amount of data to train an AI model. The inference approach inputs data unknown to the AI into the AI model to obtain a determination as to the type or other aspect of the data.

The AI model is stored in a cloud device. A terminal (client device) transmits an image to the cloud device, and the cloud device applies an image classification based on the AI model and transmits the result of the classification to the terminal. The cloud device presently carries all of the computational duties in the deep learning method.

BRIEF DESCRIPTION OF THE DRAWINGS

Implementations of the present technology will now be described, by way of embodiments, with reference to the attached figures.

DETAILED DESCRIPTION

Figure 1:
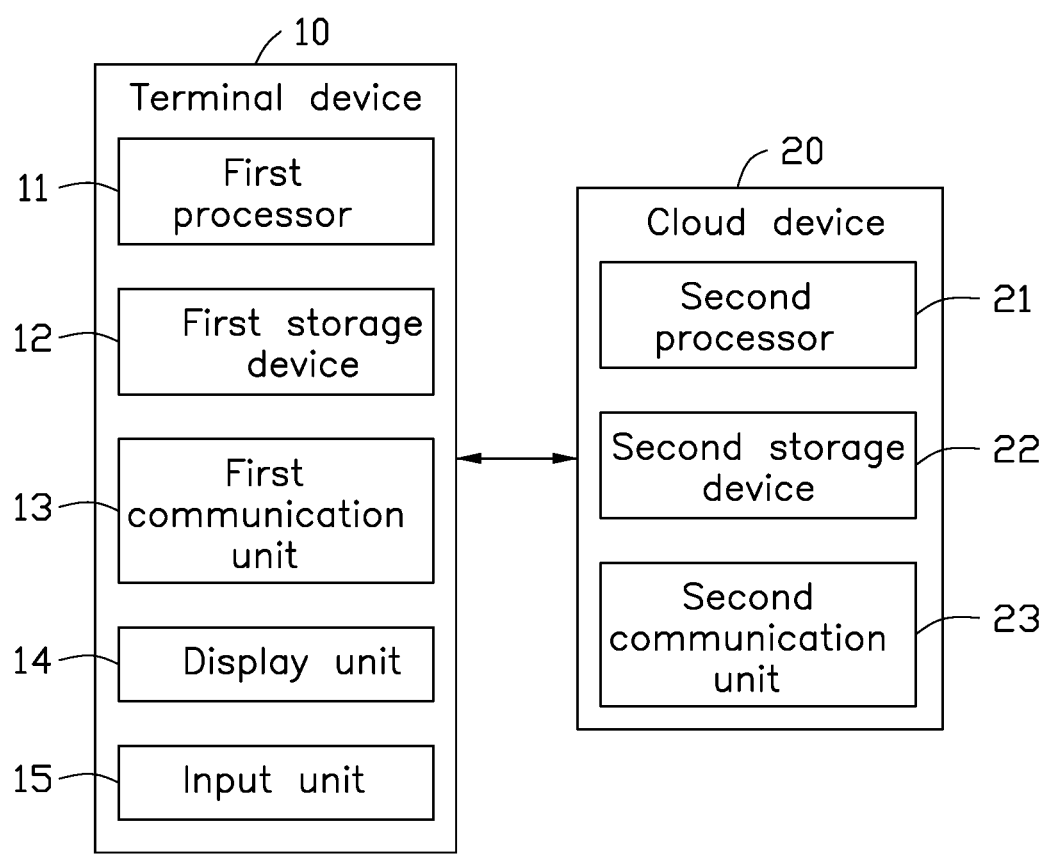
FIG. 1 is a block diagram illustrating an embodiment of an operating environment of a cloud device and a terminal device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates an embodiment of an operating environment of at least one terminal device 10 and at least one cloud device 20. In the embodiment, the cloud device 20 communicates with the terminal device 10.

The terminal device 10 can include a first processor 11, a first storage device 12, a first communication device 13, a display device 14, and an input device 15. The first storage device 12, the first communication 13, the display device 14, and the input device 15 can be electrically connected to the first processor 11. The first processor 11, the first storage device 12, the first communication device 13, the display device 14, and the input device 15 can be integrated on one device. The terminal device 10 can be one or more mobile terminals or computers.

The first processor 11 may include one or more central processors (CPU), a microprocessor, a digital processing chip, a graphics processor, or a combination of various control chips.

The first storage device 12 stores various types of data in the terminal device 10, such as program codes and the like.

The first storage device 12 is further used to store a model for image classification. The image classification model has a neural network structure. Preferably, the image classification model is a Convolutional Neural Network (CNN) model. The CNN model can include a plurality of convolution layers and a plurality of fully connected layers. In at least one embodiment, the CNN model is a Visual Geometry Group (VGG) model. In other embodiments, the image classification model may also be other types of CNN models.

The VGG model can include a plurality of convolution layers and a plurality of fully connected layers. An operation of the VGG model can include a first partial operation and a second partial operation. The first partial operation can include a plurality of convolution operations, and the second partial operation can include a plurality of fully connected operations. The convolution operation obtains high-order features of the images, which are represented by a plurality of values. A convolution kernel can take out a feature, and multiple features can be obtained by operating multiple convolution kernels. Each convolution kernel can get a third-order tensor (matrix) with a channel of 1, and the third-order tensors of multiple channels can be combined to get a new third-order tensor, which is called a feature map. The fully connected layer is used to transfer the feature map into a feature vector.

In at least one embodiment, the second partial operation can include three fully connected operations.

The first storage device 12 may be, but is not limited to, read-only memory (ROM), random-access memory (RAM), erasable programmable ROM (EPROM), electrically EPROM (EEPROM), hard disk, solid state drive, or other forms of electronic, electromagnetic, or optical recording medium.

The first communication device 13 establishes a communication with the cloud device 20 wirelessly or by wires.

The display device 14 can include at least one display screen.

The input device 15 can be used for input of various instructions or information, and the instructions include instructions for image classification. The input device 15 may include, but is not limited to, a keyboard, a mouse, a touch screen, and the like.

The cloud device 20 may include a second processor 21, a second storage device 22, and a second communication device 23. The second storage device 22 and the second communication 23 may be electrically connected to the second processor 21. The cloud device 20 can include one or more computers.

The second processor 21 can include one or more CPUs, a microprocessor, a digital processing chip, a graphics processor, or a combination of various control chips.

The second storage device 22 is used to store various types of data in the cloud device 20, such as program codes and the like.

The second storage device 22 is further used to store a model for image classification. Preferably, the image classification model stored in the second storage device 22 is same as the image classification model stored in the first storage device 12.

The second storage device 22 may be, but is not limited to, read-only memory (ROM), random-access memory (RAM), erasable programmable ROM (EPROM), electrically EPROM (EEPROM), hard disk, solid state drive, or other forms of electronic, electromagnetic, or optical recording medium.

The second communication device 23 establishes communication with first communication device 13 of the terminal device 10 wirelessly or by wires.

Figure 2:
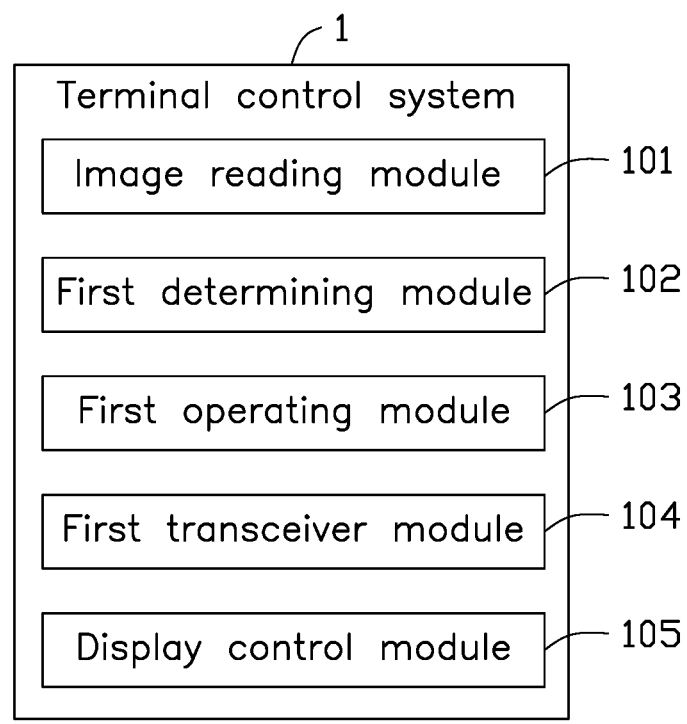
FIG. 2 is a block diagram illustrating an embodiment of the terminal device.

FIG. 2 shows a terminal control system 1 running in the terminal device 10. The terminal control system 1 may include a plurality of modules, which are a collection of software instructions stored in the first storage device 12 and executable by the first processor 11. In the embodiment as disclosed, the terminal control system 1 can include an image reading module 101, a first determining module 102, a first operating module 103, a first transceiver module 104, and a display control module 105.

The image reading module 101 reads an image for classification purposes. The image may be a picture stored in the first storage device 12.

The first determining module 102 is configured to determine whether the terminal device 10 needs to perform the first partial operation of the image classification model. The first partial operation can include a plurality of convolution operations. In at least one embodiment, the first determining module 102 can determine, according to an instruction of the image classification input by the user through the input device 15, whether the terminal device 10 needs to perform the first partial operation of the image classification model.

The first operating module 103 is configured to perform the first partial operation of the image classification model to obtain result of intermediate operation. The result of intermediate operation is represented by a plurality of values. The first operating module 103 is further configured to perform the second partial operation of the image classification model to obtain an image classification result. The second partial operation can include three fully connected operations.

The first transceiver module 104 is configured to transmit and receive various information through the first communication device 13, and the information includes the image classification instruction, the intermediate operation result, and the image classification result.

The display control module 105 is configured to control the display device 14 to display processing results of the first processor 11, such as the classification result of the image.

Figure 3:
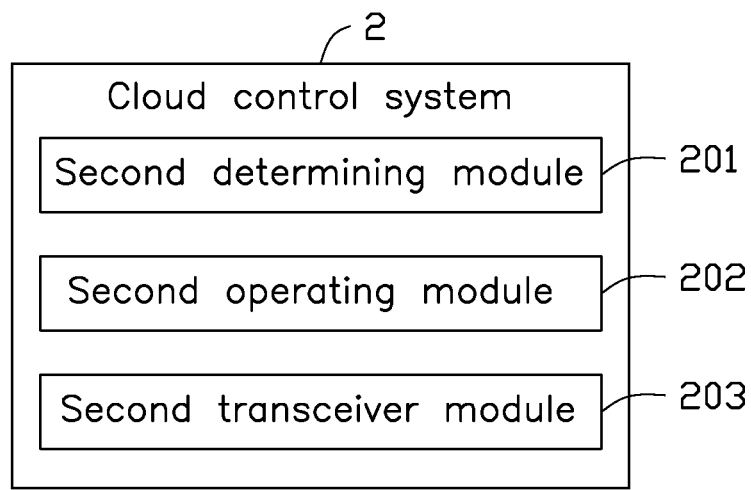
FIG. 3 is a block diagram illustrating an embodiment of the cloud device.

FIG. 3 shows a cloud control system 2 running in the cloud device 20. The cloud control system 2 may include a plurality of modules, which are a collection of software instructions stored in the second storage device 22 and are executed by the second processor 21. In the embodiment as disclosed, the cloud control system 2 can include a second determining module 201, a second operating module 202, and a second transceiver module 203.

The second operating module 201 is configured to determine whether the image classification instruction includes the intermediate operation result.

The second determining module 201 is further configured to determine whether the image classification instruction includes a requirement to perform only the first partial operation.

The second operating module 202 is configured to perform the first partial operation of the image classification model to obtain the intermediate operation result, perform the second partial operation of the image classification model to obtain the image classification result, or perform both the first and second partial operation.

The second transceiver module 203 is configured to transmit information to the terminal device 10, and the information includes the image classification instruction, the intermediate operation result, and the image classification result.

Figure 4:
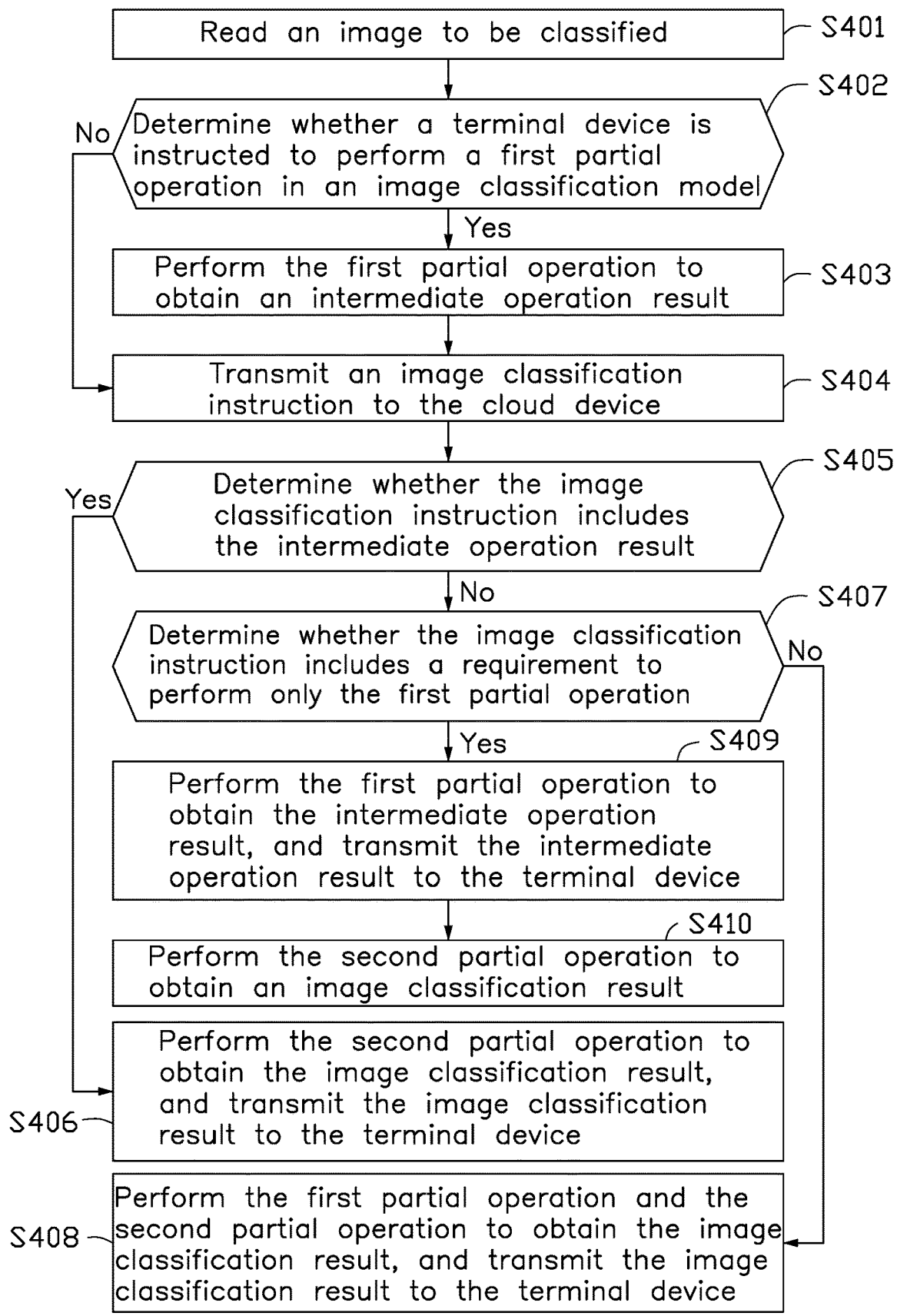
FIG. 4 is a flowchart illustrating an embodiment of a method for classifying images.

An image classification method is illustrated in FIG. 4. The method is provided by way of embodiments, as there are a variety of ways to carry out the method. Each block shown in FIG. 4 represents one or more processes, methods, or subroutines carried out in the example method. Additionally, the illustrated order of blocks is by example only and the order of the blocks can be changed. The method can begin at block S401.

At block S401, a terminal device reads an image to be classified.

An image reading module of the terminal device can read the image to be classified.

At block S402, the terminal device determines whether the terminal device needs to perform a first partial operation in an image classification model.

A first determining module of the terminal device can determine whether the terminal device needs to perform the first partial operation in the image classification model according to an instruction of image classification input by a user. If the instruction is YES, the procedure goes to block S403, otherwise, the procedure goes to block S404.

Preferably, the image classification model is VGG model including the first partial operation and a second partial operation. The first partial operation may include a plurality of convolution operation, and the second partial operation may include three fully connected operation.

At block S403, the terminal device performs the first partial operation to obtain an intermediate operation result.

A first operating module of the terminal device may perform the first partial operation of the image classification model to obtain the intermediate operation result.

At block S404, the terminal device transmits an image classification instruction to the cloud device.

A first transceiver module of the terminal device may transmit the image classification instruction to the cloud device. The image classification instruction includes the image or the intermediate operation result of the first partial operation of the image classification model.

At block S405, a cloud device determines whether the image classification instruction includes the intermediate operation result.

A second determining module of the cloud device may determine whether the image classification instruction includes the intermediate operation result. If the intermediate operation result is included, i.e., YES, the procedure goes to block S406, otherwise, the procedure goes to block S407.

At block S406, the cloud device performs the second partial operation to obtain the image classification result, and transmits the image classification result to the terminal device.

A second operation module of the cloud device may perform the second partial operation of the image classification model based on the image classification result, and thereby the image classification result is obtained. A second transceiver module may transmit the image classification result to the terminal device.

At block S407, the cloud device determines whether the instruction for image classification includes a requirement to perform only the first partial operation.

At block S405, when the intermediate operation result is not included in the instruction, that is, the image is included in the instruction, the procedure goes to block S407, wherein the second determining module of the cloud device further determines whether the instruction includes a requirement to perform only the first partial operation. If YES, the procedure goes to block S409. If not, the procedure goes to block S408.

At block S408, the cloud device performs the first partial operation and the second partial operation to obtain the image classification result, and transmits the image classification result to the terminal device.

The second operating module of the cloud device may perform the first partial operation and the second partial operation to obtain the image classification result. The second transceiver module of the cloud device may transmit the image classification result to the terminal device.

At block S409, the cloud device performs the first partial operation to obtain the intermediate result, and transmits the intermediate result to the terminal device.

When the image classification instruction includes the requirement that only the first partial operation is performed, the second operation module of the cloud device may perform the first partial operation to obtain the intermediate result, and the second transceiver module of the cloud device may transmit the intermediate result to the terminal device.

At block S410, the terminal device performs the second partial operation to obtain the image classification result.

The first operating module of the terminal device performs the second partial operation to obtain the image classification result.

In at least one embodiment, after the processes at blocks S406, S408, or S410, the method further includes a step of: controlling a display device of the terminal device to display the image classification result by a display control module.

In other embodiments, the process at block S407 and S408 can be omitted. If the result of the determination at block S405 is NO, the process directly proceeds to block S409.

In other embodiments, if the terminal device is configured to perform the first partial operation each time, the block S402 can be omitted.

In the disclosure, the terminal device 10 carried parts of the calculation processes in the image classification model, and the terminal device 10 and the cloud device 20 cooperate with each other to complete the calculation of the image classification module. The calculation load on the cloud device is thereby reduced and the efficiency of image classification is improved. Moreover, the intermediate operation result is represented by a plurality of values, which can be compressed and then transmitted between the terminal device and the cloud device. The amount of traffic in network transmissions of the intermediate operation result is smaller than that of the image itself, thereby the efficiency of data transmission and image classification are improved.

A person skilled in the art can understand that all or part of the processes in the above embodiments can be implemented by a computer program to instruct related hardware, and that the program can be stored in a computer readable storage medium. When the program is executed, a flow of steps of the methods as described above may be included.

In addition, each functional device in each embodiment may be integrated in one processor, or each device may exist physically separately, or two or more devices may be integrated in one device. The above integrated device can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A terminal device comprising:
a first communication device configured to communicate with a cloud device;
a first processor; and
at least one first storage device storing an image classification model comprising a first partial operation and a second partial operation and one or more programs, when executed by the first processor, the one or more programs cause the first processor to:
read an image to be classified;
transmit an instruction of image classification to the cloud device, the instruction of image classification comprising the image or an intermediate operation result of the first partial operation;
when the instruction of image classification comprises the image, the one or more programs further cause the first processor to:
receive the intermediate operation result transmitted from the cloud device; and
perform the second partial operation to obtain an image classification result;
when the instruction of image classification comprises the intermediate operation result, the cloud server perform the second partial operation to obtain the image classification result, and the one or more programs further cause the first processor to:
receive the image classification result of the second partial operation transmitted by the cloud device.

2. The terminal device of claim 1, wherein the image classification model is convolutional neural network model, the first partial operation comprises a plurality of convolution operation, and the second partial operation comprises a plurality of fully connected operation.

3. The terminal device of claim 1, wherein the terminal device further comprises a display device electrically connected to the processor, the one or more programs further cause the first processor to control the display device to display the image classification result.

4. The terminal device of claim 1, wherein after reading the image, the one or more programs further cause the first processor to:
determine whether the terminal device is instructed to perform the first partial operation; and
perform the first partial operation to obtain the intermediate operation result when the terminal device is instructed to perform the first partial operation.

5. The terminal device of claim 1, wherein the intermediate operation result is represented by a plurality of values.

6. A cloud device comprising:
a second communication device configured to communicate with a terminal device;

a second processor; and at least one second storage device storing an image classification model comprising a first partial operation and a second partial operation and one or more programs, when executed by the second processor, the one or more programs cause the second processor to:

receive an instruction of image classification transmitted from the terminal device;

determine whether the instruction of image classification comprises an intermediate operation result of the first partial operation;

when the instruction of image classification comprises the intermediate operation result of the first partial operation, perform the second partial operation to obtain an image classification result; and transmit the image classification result to the terminal device;

when the instruction of image classification does not comprise the intermediate operation result of the first partial operation, perform the first partial operation to obtain the intermediate operation result;

transmit the intermediate operation result to the terminal device.

7. The cloud device of claim 6, wherein the image classification model is convolutional neural network model, the first partial operation comprises a plurality of convolution operation, and the second partial operation comprises three fully connected operation.

8. The cloud device of claim 7, wherein when the instruction of image classification does not comprise the intermediate operation result of the first partial operation, the one or more programs further cause the second processor to:

determine whether the instruction of image classification comprises an instruction to perform only the first partial operation;

if no instruction to perform only the first partial operation, perform the first partial operation and the second partial operation to obtain the image classification result.

9. The cloud device of claim 7, wherein the intermediate operation result is represented by a plurality of values.

10. A method for classifying images, applied in a terminal device and a cloud device, an image classification model being stored in the terminal device and the cloud device and comprising a first partial operation and a second partial operation, the image classification method comprising:

reading, by the terminal device, an image to be classified;

transmitting, by the terminal device, an instruction of image classification to the cloud device;

determining, by the cloud device, whether the instruction of image classification comprises an intermediate operation result of the first partial operation;

performing, by the cloud device, the second partial operation to obtain an image classification result, when the instruction of image classification comprises the intermediate operation result of the first partial operation; and transmitting, by the cloud device, the image classification result to the terminal device;

performing, by the cloud device, the first partial operation to obtain the intermediate operation result of the first partial operation, when the instruction of image classification does not comprise the intermediate operation result of the first partial operation;

transmitting, by the cloud device, the intermediate operation result of the first partial operation to the terminal device; and performing, by the terminal device, the second partial operation to obtain an image classification result.

11. The image classification method of claim 10, wherein the image classification model is convolutional neural network model, the first partial operation comprises a plurality of convolution operation, and the second partial operation comprises three fully connected operation.

12. The image classification method of claim 10, wherein after reading the image, the method further comprises:

determining, by the terminal device, whether the terminal device is instructed to perform the first partial operation; and performing, by the terminal device, the first partial operation to obtain the intermediate operation result when the terminal device is instructed to perform the first partial operation.

13. The image classification method of claim 10, wherein when the instruction of image classification does not comprise the intermediate operation result, the method further comprises:

determining, by the cloud device, whether the instruction of image classification comprises an instruction to perform only the first partial operation;

if no instruction to perform only the first partial operation, perform the first partial operation and the second partial operation to obtain the image classification result.

14. The image classification method of claim 10, wherein the method further comprises: displaying the image classification result by the terminal device.

15. The image classification method of claim 10, wherein the intermediate operation result is represented by a plurality of values.

* * * * *